(12) United States Patent
Schedenig et al.

(10) Patent No.: US 8,901,249 B2
(45) Date of Patent: Dec. 2, 2014

(54) COMPOSITION BASED ON POLYPROPYLENE COMPOUNDS WITH STYRENIC BASED ELASTOMERS

(75) Inventors: Tonja Schedenig, Enns (AT); Christelle Grein, Linz (AT); Dietrich Gloger, Linz (AT)

(73) Assignee: Borealis AG, Vienna (AT)

( * ) Notice: Subject to any disclaimer, the term of this patent is extended or adjusted under 35 U.S.C. 154(b) by 580 days.

(21) Appl. No.: 12/737,636

(22) PCT Filed: Jul. 27, 2009

(86) PCT No.: PCT/EP2009/059653
§ 371 (c)(1),
(2), (4) Date: Feb. 1, 2011

(87) PCT Pub. No.: WO2010/015539
PCT Pub. Date: Feb. 11, 2010

(65) Prior Publication Data
US 2011/0129627 A1 Jun. 2, 2011

(30) Foreign Application Priority Data

Aug. 6, 2008 (EP) .................................... 08161937

(51) Int. Cl.
*C08L 23/14* (2006.01)
*C08L 23/16* (2006.01)
*C08L 53/02* (2006.01)
*C08L 23/20* (2006.01)
*C08L 23/24* (2006.01)
*C08L 51/00* (2006.01)
*C08L 23/10* (2006.01)
*C08L 51/06* (2006.01)
*C08L 23/08* (2006.01)

(52) U.S. Cl.
CPC ........... *C08L 23/142* (2013.01); *C08L 23/0815* (2013.01); *C08L 2207/02* (2013.01); *C08L 51/006* (2013.01); *C08L 23/10* (2013.01); *C08L 53/025* (2013.01); *C08L 23/08* (2013.01); *C08L 51/06* (2013.01)
USPC .............................. 525/98; 525/192; 525/240

(58) Field of Classification Search
USPC ........................................... 525/98, 192, 240
See application file for complete search history.

(56) References Cited

U.S. PATENT DOCUMENTS

| | | | |
|---|---|---|---|
| 5,948,850 A * | 9/1999 | Enami et al. | 524/515 |
| 6,677,403 B1 | 1/2004 | Abe | |
| 2001/0034416 A1 * | 10/2001 | Takayanagi et al. | 525/240 |
| 2006/0235165 A1 * | 10/2006 | Kawanabe et al. | 525/333.3 |
| 2007/0144923 A1 * | 6/2007 | Houwaert et al. | 206/219 |
| 2007/0155905 A1 * | 7/2007 | Drewniak et al. | 525/240 |

FOREIGN PATENT DOCUMENTS

| | | |
|---|---|---|
| EP | 0 422 770 A2 | 4/1991 |
| EP | 0 765 654 A1 | 4/1997 |
| EP | 0 787 750 B1 | 8/1997 |
| EP | 1 729 043 A1 | 12/2006 |
| WO | WO 97/40080 | 10/1997 |
| WO | WO 01/35898 A1 | 5/2001 |
| WO | WO 2004/026956 A1 | 4/2004 |
| WO | WO 2004/029112 A1 | 4/2004 |

OTHER PUBLICATIONS

Zimm et al.; "The Dimensions of Chain Molecules Containing Branches and Rings"; Journal of Chemical Physics, vol. 17, Issue 12, p. 1301 (1949); http://jcp.aip.org/resource/1/jcpsa6/v17/i12/p1301_s1?isAuthorized=no; (Abstract only provided).

* cited by examiner

*Primary Examiner* — Jeffrey Mullis
(74) *Attorney, Agent, or Firm* — Warn Partners, P.C.

(57) ABSTRACT

Polymer composition comprising—a heterophasic propylene copolymer comprising a polypropylene matrix and an elastomeric propylene copolymer comprising at least one comonomer selected from the group consisting of ethylene and $C_4$ to $C_{20}$ α-olefin, and—a styrenic based elastomer(s) (B), wherein the styrene content in each styrenic based elastomer (B) is equal or below 15 wt.-%, and the total amount of the styrenic based elastomer(s) (B) based on the total amount of polymers present in the polymer composition is of 16.0 to 46.0 wt.-%.

21 Claims, No Drawings

COMPOSITION BASED ON POLYPROPYLENE COMPOUNDS WITH STYRENIC BASED ELASTOMERS

This application is a National Stage of International Application No. PCT/EP2009/059653, filed Jul. 27, 2009. This application claims priority to European Patent Application No. 08161937.1 filed on Aug. 6, 2008. The disclosures of the above applications are incorporated herein by reference.

The present invention relates to a polymer composition which is useful for the preparation of sterilizable containers such as retort pouches or medical packaging, for instance for intravenous solutions.

There is an increasing trend in the food packaging industry to use plastic containers, notably pouches containing sterilized or pre-cooked foods. Retort pouches offer many advantages over rigid metal packages such as faster cooking/sterilizing time, less shelf storage space, easier disposal, improved food taste, etc. Typical pouches have a multilayer structure with polyolefins such as polyethylene or polypropylene, adhesives, barrier and external layers. It is desired that the polyolefin material imparts stiffness as well as high impact strength to the final packaging material. In addition, the polymers should comply with legal requirements about safety standards, e.g. FDA regulations in terms of the amount of hexane solubles.

The same trend, i.e. increased use of polyolefinic materials, is seen in the medical packaging industry as well. Again, the polymer should impart sufficient stiffness as well as high impact strength to the final packaging material. Further it shall have low amounts of extractables and be very transparent. In the case of medical applications, softness rather than stiffness is a key-requirement.

It is known that impact strength of polypropylene can be improved by dispersing a rubber phase within the polymer matrix, thereby obtaining a heterophasic polypropylene composition. Such a material is also called "impact-modified polypropylene".

As discussed above, it is known that heterophasic impact-modified propylene polymers provide high impact strength which is why the amount of rubber dispersed within the matrix should be sufficiently high, e.g. in stand-up pouches typically at least 10 wt % or even at least 15 wt %.

For some food packaging applications such as retort pouches or some medical packaging applications, a sterilization treatment is needed. The most common sterilization procedures are the use of heat (steam), radiation (beta radiation, electrons, or gamma radiation) or chemicals (usually ethylene oxide). Steam sterilisation is usually carried out in a temperature range of about 120 to 130° C. Of course, treatment of a polymer under the sterilization conditions outlined above can effect its final properties.

For packaging applications, it is very important that the seal strength performance of the polymeric material, in particular in the area of a welding joint where two polymer films are fixed together, is still on a high level after being subjected to a sterilization step at high temperature. If sterilization has a detrimental effect on seam strength of a welding joint fixing two polymer films within the packaging material, the welding joint could easily open under stress. This failure mode is also called "peel effect" and should be suppressed as much as possible.

However, it has turned out that seal strength performance in particular for medical pouches of standard heterophasic systems is not satisfying. In other words, in known impact-modified polypropylenes, the impact strength can be adjusted by the amount of rubber. However the rubber has a negative influence on the seal strength (or peeling resistance). The weakness of the known impact-modified polypropylene materials with respect to their seal strength performance after a sterilization step in particular at higher rubber loadings limits their use to pouches.

Also the haze of the known heterophasic systems, even though the impact is improved compared to pure random polypropylenes, is too high to be applicable in the medical sector.

EP 0 765 654 A1 describes pouches comprising at least one layer based on a composition of isotactic polypropylene and an elastomeric styrene block copolymer. However this invention does not deal with the question as to how the seal strength performance after sterilization can be kept on high levels without loosing other good properties needed in this technical field like toughness and low haze.

Considering the drawbacks outlined above, it is an object of the present invention to provide a polymer composition which has high seal strength after being subjected to a sterilization treatment, while simultaneously having good haze values, i.e. below 15% (after sterilization) on films having a thickness of 100 μm or less. Furthermore, the final composition may keep the toughness, in particular the film toughness in terms of failure energy, on a high level.

The finding of the present invention is that the polymer composition must comprise a heterophasic propylene copolymer and a styrenic based elastomer having a rather low styrene content. Further both components in the polymer composition shall preferably have similar melt flow rates.

Accordingly the present invention is directed to a polymer composition comprising
(a) a heterophasic propylene copolymer (A) comprising, preferably consisting of,
  (a-1) a polypropylene matrix (A-1) and
  (a-2) an elastomeric propylene copolymer (A-2) comprising at least one comonomer selected from the group consisting of ethylene and $C_4$ to $C_{20}$ α-olefin,
and
(b) styrenic based elastomer(s) (B),
wherein
(i) the styrene content in each styrenic based elastomer (B) is equal or below 15 wt.-%,
and
(ii) the total amount of the styrenic based elastomer(s) (B) based on the total amount of polymers present in the polymer composition is of 16.0 to 46.0 wt.-%.

Preferably the styrenic based elastomer(s) (B) is(are) preferably a styrene-ethylene/butylene-styrene (SEBS) block copolymer (B-1) and/or a hydrogenated styrene-vinyl isoprene (SIS) block rubber (B-2).

Accordingly the present invention is preferably directed to a polymer composition comprising
(a) a heterophasic propylene copolymer (A) comprising, preferably consisting of,
  (a-1) a polypropylene matrix (A-1) and
  (a-2) an elastomeric propylene copolymer (A-2) comprising at least one comonomer selected from the group consisting of ethylene and $C_4$ to $C_{20}$ α-olefin,
and
(b) styrenic based elastomer(s) (B) being a styrene-ethylene/butylene-styrene (SEBS) block copolymer (B-1) and/or a hydrogenated styrene-vinyl isoprene (SIS) block rubber (B-2)
wherein
(i) the styrene content in each styrenic based elastomer (B) is equal or below 15 wt.-%, and (ii) the total amount of the styrenic based elastomer(s) (B) based on the total amount of polymers present in the polymer composition is of 16.0 to 46.0 wt.-%.

More preferably the polymer composition comprises as styrenic based elastomer(s) (B) only a styrene-ethylene/butylene-styrene (SEBS) block copolymer (B-1) and/or a hydrogenated styrene-vinyl isoprene (SIS) block rubber (B-2). Thus it is in particular appreciated that the polymer composition comprises as styrenic based elastomers (B) either a styrene-ethylene/butylene-styrene (SEBS) block copolymer (B-1) or a hydrogenated styrene-vinyl isoprene (SIS) block rubber (B-2).

Further it is appreciated that the heterophasic propylene copolymer (A) and the styrenic based elastomer(s) (B) are the only polymer components in the polymer composition.

Accordingly it is in particular preferred that the polymer composition according to this invention comprises as the only polymer components within the composition
(i) the heterophasic propylene copolymer (A) and
(ii) the styrene-ethylene/butylene-styrene (SEBS) block copolymer (B-1) and/or the hydrogenated styrene-vinyl isoprene (SIS) block rubber (B-2).

Surprisingly it has been found out that films based of the inventive polymer composition show excellent seal strength after sterilization by keeping the haze at low levels. Further the toughness, in particular in terms of failure energy, of said films is improved compared to classical heterophasic polypropylenes (see Table 3).

In the following the present invention is described in more detail.

As stated above the inventive polymer composition is defined by the mixture of a heterophasic propylene copolymer (A) and styrenic based elastomer(s) (B), i.e. preferably a styrene-ethylene/butylene-styrene (SEBS) block copolymer (B-1) and/or a hydrogenated styrene-vinyl isoprene (SIS) block rubber (B-2).

A heterophasic propylene copolymer (A) according to this invention contains beside propylene other α-olefine(s), for instance ethylene. Moreover such a heterophasic propylene copolymer (A) has preferably a multiphase structure with a polypropylene matrix and inclusions comprising at least, preferably consisting of, an elastomeric phase, i.e. an amorphous propylene copolymer ("rubber"), and optionally a crystalline polyethylene. Normally such a heterophasic propylene copolymer (A) is obtained by carrying out a multi-stage process, like at least a two-stage process, preferably a three stage process, resulting in such heterophasic system.

Preferably the polypropylene matrix (A-1) is isotactic. Accordingly it is appreciated that the polypropylene matrix (A-1) has a rather high pentad concentration, i.e. higher than 90%, more preferably higher than 92%, still more preferably higher than 93% and yet more preferably higher than 95%.

Additionally it is appreciated that the polypropylene matrix (A-1) is not chemically modified as it is known for instance from high melt strength polymers (HMS-polymer). Thus the propylene copolymer (A) is not cross-linked. The impact behaviour can normally also be improved by using branched polypropylenes as for instance described in EP 0 787 750, i.e. single branched polypropylene types (Y-polypropylenes having a backbone with a single long side-chain and an architecture resembles a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$ in which g' is the branching index, $[INT]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the polypropylene matrix (A-1) shall be at least 0.85, more preferably at least 0.90, yet more preferably at least 0.95, like 1.00.

Further, the polypropylene matrix (A-1) of the heterophasic propylene copolymer (A) can be a propylene copolymer (A-1') or a propylene homopolymer (A-1"). However it is preferred that the polypropylene matrix (A-1) is a propylene copolymer (A-1').

The expression propylene homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Where the polypropylene matrix (A-1) is a propylene copolymer (A-1'), which is in particular preferred, the propylene copolymer (A-1') comprises at least one comonomer selected from the group consisting of ethylene and $C_4$ to $C_{20}$ α-olefin, preferably at least one comonomer selected from the group consisting of ethylene and $C_4$ to $C_{10}$ α-olefin, e.g. 1-butene or 1-hexene. Most preferably the propylene copolymer (A-1') is a propylene ethylene copolymer. The comonomer content, like ethylene content, in the polypropylene matrix (A-1) is in such a case preferably relatively low, i.e. up to 5.0 wt.-%, more preferably 0.2 to 5.0 wt.-%, still more preferably 0.5 to 5.0 wt.-%, yet more preferably 1.5 to 5.0 wt.-%.

The polypropylene matrix (A) can be unimodal or multimodal, like bimodal in view of the molecular weight distribution and/or the comonomer content distribution. However it is preferred that the propylene matrix (A) is multimodal, in particular bimodal, in view of the comonomer content.

The expression "multimodal" or "bimodal" used herein refers to the modality of the polymer, i.e.
the form of its molecular weight distribution curve, which is the graph of the molecular weight fraction as a function of its molecular weight,
or more preferably
the form of its comonomer content distribution curve, which is the graph of the comonomer content as a function of the molecular weight of the polymer fractions.

As will be explained below, the polymer components of the polypropylene matrix (A) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene homopolymer (A-1") may be multimodal or bimodal in view of the molecular weight. In turn the propylene copolymer (A-1') may be multimodal, like bimodal, in view of the comonomer content and/or molecular weight. It is in particular appreciated that the propylene copolymer (A-1') is multimodal, like bimodal, in view of the comonomer content.

Further in case the polypropylene matrix (A-1) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the polypropylene matrix (A-1). Accordingly in case of a bimodal system, in particular in view of the comonomer content, the split of the two fractions is roughly 50:50. Thus in a preferred embodiment the polypropylene matrix (A-1) comprises two fractions which differ in their comonomer content, like ethylene content, wherein the first fraction is present from 40 to 60 wt.-% and the second fraction from 60 to 40 wt.-%.

The difference of the comonomer content between the two fractions is defined in a way of a preferred embodiment in the following paragraph.

Therefore it is preferred that the polypropylene matrix (A) is a propylene copolymer (A-1') with at least two fractions that have different comonomer contents. Even more preferred the propylene copolymer (A-1') comprises at least two fractions, more preferably consists of two fractions, that have a comonomer content, like ethylene content, which differ of at least 2.0 wt.-%, more preferably differ of at least 2.5 wt.-%. Surprisingly it has been found out that such bimodal distribution of comonomer content improves the haze behaviour of the sterilised product. On the other hand the difference in the comonomer content in the two fractions should be not too high, i.e. not higher than 6.0 wt.-%, preferably not higher than 5.0 wt %, to avoid any separation tendencies. Thus it is appreciated that the propylene copolymer (A-1') comprises at least two fractions, more preferably consists of two fractions, that have comonomer contents which differ of 2.0 to 6.0 wt.-%, more preferably of 2.5 to 5.0 wt.-%. Accordingly in one embodiment the propylene copolymer (A-1') consists of a first fraction being a propylene homopolymer and a second fraction being a propylene copolymer having a comonomer content, preferably ethylene content, of at least 2.0 wt.-%, more preferably of at least 3.0 wt.-%, like at least 3.5 wt.-%, e.g. 4.0 wt.-%.

It is further appreciated that the polypropylene matrix (A-1) has a rather low melt flow rate (MFR), i.e. a rather high molecular weight. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$ (230° C.). Accordingly, it is preferred that in the present invention the propylene matrix (A) has an MFR$_2$ (230° C.) below 10.0 g/10 min, more preferably below 8.0 g/10 min, still more preferably below 6.0 g/10 min.

As a further requirement of the present invention the heterophasic propylene copolymer (A) must comprise an elastomeric propylene copolymer (A-2).

According to the present invention the amount of elastomeric propylene copolymer (A-2) is defined by the amount of xylene cold soluble fraction of the total heterophasic propylene copolymer (A) minus the amount of xylene cold soluble fraction of the polypropylene matrix (A-1) [Rubber=XCS (Total)–XCS(Matrix)].

Thus it is appreciated that the xylene cold soluble fraction of the heterophasic propylene copolymer (A) is of 8.0 to 30.0, more preferably from 9.0 to 25.0 wt.-%, yet more preferably from 10.0 to 20.0 wt.-%.

Further the elastomeric propylene copolymer (A-2) shall be present in the heterophasic propylene copolymer (A) from 3.0 to 25.0 wt.-%, more preferably from 4.0 to 20.0 wt.-%, yet more preferably from 5.0 to 15.0 wt.-%.

Preferably the elastomeric propylene copolymer (A-2) must comprise propylene and at least one other $C_2$ to $C_{20}$ α-olefin, more preferably propylene and at least one other $C_2$ to $C_{10}$ α-olefin. Preferably the elastomeric propylene copolymer (A-2) comprises, preferably consists of, propylene and at least one α-olefin comonomer selected from the group consisting of ethylene, 1-butene, 1-pentene, 1-hexene, 1-heptene and 1-octene. Preferably the elastomeric propylene copolymer (A-2) comprises at least propylene and ethylene and may comprise a further α-olefin as defined in this paragraph. However it is in particular preferred that the elastomeric propylene copolymer (A-2) comprises, more preferably consists of, propylene and ethylene as the only polymerizable units. Thus an ethylene-propylene rubber (EPR) as elastomeric propylene copolymer (A-2) is most preferred.

Like the polypropylene matrix (A-1) the elastomeric propylene copolymer (A-2) can be unimodal or multimodal, like bimodal. However it is preferred that the elastomeric propylene copolymer (A-2) is unimodal. Concerning the definition of unimodal and multimodal, like bimodal, it is referred to the definition above.

The elastomeric propylene copolymer (A-2) is in particular featured by a relatively high amount of propylene derived units. Relatively high amounts of propylene units are appreciated as similar levels of propylene in the matrix as well as in the elastomeric phase support the sealing behaviour of the final material. As the xylene cold soluble fraction of the heterophasic propylene copolymer (A) is dominated by the elastomeric propylene copolymer (A-2) (the xylene cold soluble fraction of the polypropylene matrix (A-1) is not more than 10 wt.-%, preferably not more than 8.0 wt.-%), it is appreciated that the amount of propylene in the xylene cold soluble fraction of the heterophasic propylene copolymer (A), is at least 52 wt.-%, more preferably at least 58 wt.-%, yet more preferably at least 63 wt.-%. Accordingly the amount of the other $C_2$ to $C_{20}$ α-olefin(s), i.e. excluding propylene, in the xylene cold soluble fraction of the heterophasic propylene copolymer (A), is below 48 wt.-%, more preferably below 42 wt.-%, yet more preferably below 37 wt.-%. Preferred ranges for the other $C_2$ to $C_{20}$ α-olefin(s), i.e. excluding propylene, in the xylene cold soluble fraction of the heterophasic propylene copolymer (A), is 48 to 10 wt.-%, more preferably 40 to 15 wt.-%. The mentioned comonomer values apply in particular in case an elastomeric propylene copolymer (A-2) is used in which ethylene as a comonomer is present. Preferably the elastomeric propylene copolymer (A-2) is an ethylene-propylene rubber (EPR), in particular with a propylene and/or an ethylene content as defined in this paragraph.

A further important characteristic of the elastomeric propylene copolymer (A-2) is its rather low intrinsic viscosity. As stated above, the xylene cold soluble fraction is dominated by the elastomeric propylene copolymer (A-2). Accordingly in case the elastomeric propylene copolymer (A-2) is featured by a rather low intrinsic viscosity this is reflected by the intrinsic viscosity of the xylene cold soluble fraction of the total heterophasic propylene copolymer (A). Thus it is preferred that the xylene cold soluble fraction of the heterophasic propylene copolymer (A), IV of XCS, is equal or below 4.0 dl/g, yet more preferably below 3.0 dl/g, still more preferably below 2.5 dl/g, still yet more preferably below 2.0 dl/g. In a preferred embodiment the intrinsic viscosity is in the range of 1.0 to 3.0 dl/g, still more preferred in the range of 1.5 to 2.5 dl/g. The intrinsic viscosity is measured according to ISO 1628 in decaline at 135° C. Such low intrinsic viscosities support also the transparency of the final material.

It is however not only appreciated that the intrinsic viscosity of the xylene cold soluble fraction is rather low, but it is also sought to achieve a specific viscosity ratio between the xylene cold soluble fraction and the xylene cold insoluble fraction of the heterophasic propylene copolymer (A). This ratio reflects in a first approximation the intrinsic viscosity ratio of the polypropylene matrix (A-1) and the elastomeric propylene copolymer (A-2) of the heterophasic propylene copolymer (A). The intrinsic viscosity of the xylene cold soluble fraction and of the xylene insoluble fraction is measured according to ISO 1628 in decaline at 135° C.

Accordingly it is appreciated that the intrinsic viscosity ratio of xylene cold soluble fraction and the xylene cold insoluble fraction (IV of $XCS_{sol}$/IV of $XCS_{insol}$) is 11 equal or below 1.0, preferably equal or below 0.8. On the other hand the differences in the viscosity should be not too high. Thus a preferred range for the intrinsic viscosity ratio of the xylene cold soluble fraction and the xylene cold insoluble fraction (IV of $XCS_{sol}$/IV of $XCS_{insol}$) is of 0.5 to 1.0, more preferred of 0.6 to 0.9.

Moreover not only the propylene matrix (A-1) as defined above shall have a rather low melt flow rate but also the heterophasic propylene copolymer (A). Accordingly it is appreciated that the heterophasic propylene copolymer (A) has an $MFR_2$ (230° C.) of below 10.0 g/10 min, yet more preferably below 8.0 g/10 min, still more preferably below 6.0 g/10 min and yet more preferably below 4.0 g/10 min. A preferred lower limit is 0.1 g/10 min, more preferred 0.5 g/10 min. Thus in preferred embodiments the heterophasic propylene copolymer (A) has a $MFR_2$ (230° C.) of 0.1 to 6.0 g/10 min, more preferred of 0.5 to 4.0 g/10 min.

The additional required component in the present invention is a styrenic thermoplastic elastomer. This additional component may be dispersed in the heterophasic propylene copolymer (A). It has been discovered that not any styrenic thermoplastic elastomer is suitable for the present invention but only a specific class of such elastomers. Accordingly for the present invention (a) styrenic based elastomer(s) (B) with a rather low styrene content, i.e. being equal or below 15 wt.-%, must be used.

Preferably the styrenic based elastomer(s) (B) can be a styrene-ethylene/butylene-styrene (SEBS) block copolymer (B-1) and/or a hydrogenated styrene-vinyl isoprene (SIS) block rubber (B-2).

Accordingly it is appreciated that the styrenic based elastomer(s) (B), preferably the styrene-ethylene/butylene-styrene (SEBS) block copolymer (B-1) and/or the hydrogenated styrene-vinyl isoprene (SIS) block rubber (B-2), has (have) a styrene content of equal or below 15 wt.-%, more preferably of equal or below 14 wt-%, yet more preferably of equal or below 13 wt.-%. On the other hand the styrene content in the styrenic based elastomer(s) (B), preferably in the styrene-ethylene/butylene-styrene (SEBS) block copolymer (B-1) and/or in the hydrogenated styrene-vinyl isoprene (SIS) block rubber (B-2), shall not fall below 10 wt.-%. Thus a preferred range is of 10 to 15 wt.-%, more preferred of 11 to 14 wt.-% and yet more preferred of 11 to 13 wt.-%.

Further it is appreciated that the styrenic based elastomer(s) (B), preferably the styrene-ethylene/butylene-styrene (SEBS) block copolymer (B-1) and/or the hydrogenated styrene-vinyl isoprene (SIS) block rubber (B-2), has (have) a moderate melt flow rate $MFR_2$ (230° C.), i.e. not more than 20.0 g/10 min, more preferably not more than 10.0 g/10 min, still more preferably not more than 6.0 g/10 min. On the other hand the melt flow rate of the styrenic based elastomer(s) (B), preferably the styrene-ethylene/butylene-styrene (SEBS) block copolymer (B-1) and/or the hydrogenated styrene-vinyl isoprene (SIS) block rubber (B-2), shall not fall below 1.0 g/10 min. Accordingly, a preferred range is of 1.0 to 20.0 g/10 min, more preferred of 3.0 to 10.0 g/10 min, still more preferred of 3.0 to 6.0 g/10 min.

Further the styrenic based elastomer(s) (B), preferably the styrene-ethylene/butylene-styrene (SEBS) block copolymer (B-1) and/or the hydrogenated styrene-vinyl isoprene (SIS) block rubber (B-2), may be defined by its density. Thus it is appreciated that the styrenic based elastomer (B), preferably the styrene-ethylene/butylene-styrene (SEBS) block copolymer (B-1) and/or the hydrogenated styrene-vinyl isoprene (SIS) block rubber (B-2), has (have) a density of equal or below 0.900 $g/cm^3$, more preferred about 0.890 $g/cm^3$.

An additional mandatory requirement of the present invention is the amount of the styrenic based elastomer(s) (B) in the present invention. As stated above the styrenic based elastomer(s) (B) shall be present in the polymer composition from 16 to 46 wt.-%, more preferably from 20 to 45 wt.-%, sill more preferably from 26 to 45 wt.-%, based on the total amount of polymers present in the invention, more preferably based on the amount of the heterophasic propylene copolymer (A) and the styrenic based elastomer(s) (B) together. In case the styrene-ethylene/butylene-styrene (SEBS) block copolymer (B-1) and/or the hydrogenated styrene-vinyl isoprene (SIS) block rubber (B-2) is (are) the only the styrenic based elastomers (B) within the polymer composition, the ranges given in this paragraph refer the styrene-ethylene/butylene-styrene (SEBS) block copolymer (B-1) and/or the hydrogenated styrene-vinyl isoprene (SIS) block rubber (B-2) only.

It has been further discovered that the properties can be further enhanced in case both main components, i.e. the heterophasic propylene copolymer (A) and styrenic based elastomer(s) (B), preferably the styrene-ethylene/butylene-styrene (SEBS) block copolymer (B-1) and/or the hydrogenated styrene-vinyl isoprene (SIS) block rubber (B-2), have concerted melt flow rates. Accordingly it is appreciated that the $MFR_2$ (230° C.) ratio of the heterophasic propylene copolymer (A) and styrenic based elastomer (B), preferably the styrene-ethylene/butylene-styrene (SEBS) block copolymer (B-1) and/or the hydrogenated styrene-vinyl isoprene (SIS) block rubber (B-2), ($MFR_{(A)}/MFR_{(B)}$) is equal or below 1.0, more preferably equal or below 0.9. On the other hand the differences in the viscosity should be not too high. Thus a preferred the $MFR_{(A)}/MFR_{(B)}$ ratio is of 0.3 to 0.9, more preferred of 0.4 to 0.8.

The present invention may comprise beside the polymer components in the polymer composition additional additives as known in the art, for instance antioxidants. However the additives shall be not more than 10.0 wt.-%, preferably not more than 8.0 wt.-%, more preferably not more than 5.0 wt.-%, yet more preferably not more than 4.0 wt.-%, still more preferably not more than 3.0 wt.-%, in the total polymer composition. Further the present polymer composition may comprise additional polymer components other than the heterophasic propylene copolymer (A) and styrenic based elastomer(s) (B), preferably the styrene-ethylene/butylene-styrene (SEBS) block copolymer (B-1) and/or the hydrogenated styrene-vinyl isoprene (SIS) block rubber (B-2). However it is in particular preferred that the polymer composition of the present invention contain less than 1.4 wt.-%, more preferably less than 1.0 wt.-%, yet more preferably less than 0.5 wt.-%, of polyethylene wax. In an especially preferred embodiment no wax is detectable, e.g. not present. A polyethylene wax according to this invention is any polyethylene having a melting point equal or below 140° C. and/or having a number average molecular weight Mn of equal or below 100,000. In particular a polyethylene wax according to this invention is an (oxidized) polyethylene wax having acid number of 5 to 35 mg KOH/g, a number average molecular weight Mn of 1,000 to 100,000, and a melting point of 92 to 140° C.

Especially preferred, as stated above, the present invention is in particular directed to a polymer composition comprising the heterophasic propylene copolymer (A) and styrenic based elastomer(s) (B), preferably the styrene-ethylene/butylene-styrene (SEBS) block copolymer (B-1) and/or the hydrogenated styrene-vinyl isoprene (SIS) block rubber (B-2), as the only polymer components in the polymer composition.

Thus it is appreciated that the heterophasic propylene copolymer (A) and styrenic based elastomer(s) (B), preferably the styrene-ethylene/butylene-styrene (SEBS) block copolymer (B-1) and/or the hydrogenated styrene-vinyl isoprene (SIS) block rubber (B-2), together constitute at least 60.0 wt.-%, more preferably at least 70.0 wt-%, yet more preferably at least 80.0 wt-%, still more preferably 90.0 wt-%, e.g. 92.0 wt.-%, yet still more preferably 95.0 wt.-%, like 97.0 wt.-%, of the inventive polymer composition.

It has been discovered that the inventive polymer composition as defined herein is in particular suitable as a sealable film. Thus the present invention is also directed to the use of the polymer composition as defined in the instant invention for the preparation of films, in particular sterilisable or sterilised films, and/or containers, like pouches, in particular sterilisable or sterilised containers, like pouches.

Further the present invention is directed to a film comprising the polymer composition as defined in the instant invention. More preferably the polymer composition is the only polymer component in the film. Further the present invention is directed to a container, comprising the film and/or the polymer composition as defined in herein. The container is in particular a pouch. Further said container, i.e. pouch, has been preferably subjected to a sterilisation treatment.

Additionally the present invention is directed to a process for the manufacture of the inventive polymer composition as defined herein comprising the following steps:

preparing a polypropylene matrix (A-1), preferably a propylene homopolymer (A-1") or propylene copolymer (A-1') constituting the matrix, preparing the elastomeric propylene copolymer (A-2) and dispersing the elastomeric copolymer (A-2) in the polypropylene matrix (A-1) to obtain the heterophasic propylene copolymer (A), preferably the elastomeric copolymer (A-2) is prepared in the presence of the polypropylene matrix (A-1) constituting the matrix and is in situ dispersed in the matrix (A-1), and subsequently mixing said heterophasic propylene copolymer (A) with the styrenic based elastomer(s) (B), preferably the styrene-ethylene/butylene-styrene (SEBS) block copolymer (B-1) and/or the hydrogenated styrene-vinyl isoprene (SIS) block rubber (B-2).

According to the present invention, there is also provided a process for the manufacture of the heterophasic propylene copolymer (A) discussed above. The elastomeric propylene copolymer (A-2) may be blended with the polypropylene matrix (A-1) after their polymerizations and are subsequently mixed with the styrenic based elastomer(s) (B), preferably the styrene-ethylene/butylene-styrene (SEBS) block copolymer (B-1) and/or the hydrogenated styrene-vinyl isoprene (SIS) block rubber (B-2). However, more desirably, the heterophasic propylene copolymer (A) is produced in a multistage process and subsequently mixed with the styrenic based elastomer(s) (B), preferably the styrene-ethylene/butylene-styrene (SEBS) block copolymer (B-1) and/or the hydrogenated styrene-vinyl isoprene (SIS) block rubber (B-2). In a particular preferred embodiment the polypropylene matrix (A-1) is produced at least in one slurry reactor or a slurry and a gas phase reactor and subsequently the elastomeric propylene copolymer (A-2) is produced at least in one gas phase reactor. Accordingly the heterophasic propylene copolymer (A) of the instant invention can be typically produced in a cascade of up to 4 reactors, where the first reactor is a liquid bulk reactor preferably of loop design, the second reactor is either a liquid bulk reactor preferably of loop design or a gas phase reactor and all subsequent reactors are gas phase reactors preferably of fluidized bed design. The components produced in the first two reactors are crystallizable propylene homopolymers or copolymers with a minor amount of ethylene and/or other alpha-olefins (max. 8 wt.-%) (obtaining the matrix), while the component produced in the third reactor is a largely amorphous copolymer with higher amounts of comonomer and the component produced in the fourth reactor is either also a largely amorphous copolymer or a crystalline ethylene homo- or copolymer. According to a specific embodiment, only three reactors can be utilized with either the second reactor being bypassed or the fourth reactor not being utilized. According to another specific embodiment, only the first and the third reactor are utilized.

In the following a preferred process is described in more detail: Such a process for the manufacture of the present invention comprises the following steps:

(i) polymerizing propylene and optionally other α-olefin(s) in a first reactor system, preferably comprising a bulk loop reactor and optionally a gas phase reactor, to obtain a polypropylene matrix (A-1)

(ii) transferring the obtained propylene matrix (A-1) in a second reactor system, preferably comprising at least one gas phase reactor, (iii) polymerizing propylene and at least one other $C_2$ to $C_{20}$ α-olefin in said second reactor system in the presence of the polypropylene matrix (A-1) to obtain an elastomeric propylene copolymer (A-2), and (iv) mixing, in particular melt mixing, the obtained material with styrenic based elastomer(s) (B), preferably the styrene-ethylene/butylene-styrene (SEBS) block copolymer (B-1) and/or the hydrogenated styrene-vinyl isoprene (SIS) block rubber (B-2).

The sequence (i) and (iii) can be reversed run, i.e. the elastomeric propylene copolymer (A-2) can be produced first and subsequently the polypropylene matrix (A-1). However, it is preferred to have the sequence (i) to (iii) as stated above.

The comonomer feeds into the various reactors may be adapted to produce the heterophasic propylene copolymer (A) with the desired properties and the amounts of comonomer will be readily determined by the person skilled in the art.

By using—as stated above—a loop reactor and at least one gas phase reactor in serial configuration and working at different conditions, a multimodal (e.g. bimodal) propylene matrix (A-1), in particular in view of the comonomer content, i.e. in view of the ethylene content, can be obtained.

Further details concerning the manufacture of heterophasic propylene copolymers (HECO) can be derived from WO 97/40080.

In such a procedure, the catalyst system used may be varied between stages but is preferably the same for all stages. Especially preferably a prepolymerized heterogeneous catalyst is used.

As a catalyst for the preparation of the heterophasic propylene copolymer (A) preferably a Ziegler-Natta catalyst system is used. Such Ziegler-Natta catalyst systems are known in the art and comprise a catalyst component, a cocatalyst component and an external donor. The catalyst component of the catalyst system primarily containing magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

Especially useful solid catalyst components are those disclosed in WO 2004/029112. Thus, in an especially preferred embodiment of the present invention, the solid catalyst component is prepared by a process comprising: preparing a solution of magnesium complex by reacting an alkoxy magnesium compound and an electron donor or precursor thereof in a $C_6$ to $C_{10}$ aromatic liquid reaction medium: reacting said magnesium complex with a compound of at least one fourvalent group 4 metal at a temperature greater than 10° C. and less than 60° C. to produce an emulsion of a denser, $TiCl_4$/toluene insoluble, oil dispersed phase having group 4 metal/Mg molar ratio 0.1 to 10 in an oil dispersed phase having group 4 metal/Mg molar ratio 10 to 100, agitating the emulsion, optionally in the presence of an emulsion stabiliser and/or a turbulence minimising agent, in order to maintain the droplets of said dispersed phase within an average size range of 5 to 200 µm. The catalyst particles are obtained after solidifying said particles of the dispersed phase by heating. In said process, an aluminium alky compound of the formula $AlR_{3-n}X_n$, where R is an alkyl group of 1 to 20, preferably 1 to 10 carbon atoms, X is a halogen and n is 0, 1, 2 or 3, is added and brought into contact with the droplets of the dispersed phase of the agitated emulsion before recovering the solidified particles.

The solid catalyst component used in this invention is prepared otherwise according to Example 8 of WO 2004/029112, except that diethylaluminium chloride was used as an aluminium compound instead of triethylaluminium.

As described above, after the manufacture of the heterophasic propylene copolymer (A) the mixing with styrenic based elastomer(s) (B) follows.

The films made out of the polymer composition can be produced in the manner known in the art. For instance the films are produced on a film extruder obtaining cast films. More specifically the melt pressure of the extruder is preferably from 40 to 80 bar, the extruder screw rotational speed is preferably of about 50 rpm and the chill roll temperature of about 15° C.

The present invention will now be illustrated in further detail by the following examples.

EXAMPLES

Measuring Methods

1. Mw, Mn, MWD

Mw/Mn/MWD are measured by Gel Permeation Chromatography (GPC) according to the following method:

The weight average molecular weight (Mw) and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL, of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

2. Melt Flow Rate (MFR)

The melt flow rates are measured with a load of 2.16 kg ($MFR_2$) at 230° C. The melt flow rate is that quantity of polymer in grams which the test apparatus standardised to ISO 1133 extrudes within 10 minutes at a temperature of 230° C. under a load of 2.16 kg.

3. Comonomer Content

Comonomer content (wt %) is determined in a known manner based on Fourier transform infrared spectroscopy (FTIR) determination calibrated with $C^{13}$—NMR.

4. Xylene Cold Soluble Fraction (XCS wt %)

The xylene cold soluble fraction (XCS) is determined at 23° C. according to ISO 6427.

5. Intrinsic Viscosity

The intrinsic viscosity (IV) is determined according to ISO 1628-1 at 135° C. with decaline as solvent.

6. Dynatest, Measured at 23° C.

The Dynatest measures the toughness and extensibility of the material. The normalized failure energy $W_F/d$ [J/mm] can be regarded as the total energy per mm thickness that a film can absorb before it breaks. The higher this value, the tougher the material is. The normalized failure energy $W_F/d$ [J/mm] is measured according to ISO 7765-2.

7. Seam Strength Measurements

The seam strength is measured by tearing the seam with defined speed until it breaks. The measurement procedure is as follows:

Two identical PP films are welded together by applying a defined temperature and a defined pressure for a defined time. In the present case this welding is done at two different temperatures (180° C. and 220° C.) with a force of 300 N for 0.5 seconds.

The strength of said welding joint is then measured by a Tensile Test following ISO 527: at a temperature of 23° C., the welding joint is fixed with clamps. The clamps start to move away from each other and by doing this apply stress to the film/welding joint. The movement of the clamps is going on until one of the following events:

(a) the film breaks next to the welding joint (desired failure mode in this case) or
(b) the welding joint opens (called "peel effect", this failure mode is not desired for the materials described in the present invention)

During this measurement the following parameters are continuously measured:

(1) the force that the film resists as a function of the actual elongation of the film. This is recorded continuously, at any time of the measurement one gets the actual elongation and the stress the film opposed this elongation. The parameter "$\epsilon$break" (=elongation at break) represents the length of the film related to the original length at the moment the film or welding joint breaks. It is given in % with the original length of the specimen before the measurement being 100%.

The parameter "Wbreak" (=work at break) represents the total energy that the film/welding joint has consumed until the moment the film/welding joint breaks (area below the stress-elongation curve in the interval between elongation=10% (=Original length) and $\epsilon$ break).

(2) Every measurement is done on 10 welding joints. After the measurements the broken specimens are evaluated for the failure mode (a) or (b). In our example sheet we also give values for "peel": this means how many out of 10 specimens show the undesired failure mode (b): This value is desired to be as low as possible, ideally 0.

8. Melting Temperature

Melting temperature Tm is measured with Mettler TA820 differential scanning calorimeter (DSC) on 5 to 10 mg, typically 8±0.5 mg samples. Melting curves are obtained during 10° C./min heating scans between 30° C. and 225° C. The samples are heated—cooled down—and again heated. Melting temperature is taken as the peak of the second heating process.

9. Density

Density is determined according to ISO 1183.

10. Styrene Content

The styrene content is measured by Fourier transform infrared spectroscopy (FTIR). A thin film of 300 μm thickness is prepared from pelletized material by hot-pressing (190° C., 100 bar, 1 minute). Per sample, two films are prepared. The so prepared film-samples are measured by a Perkin Elmer IR-Spectrophotometer System 2000FTIR. The peak at 1602 cm$^{-1}$ (Phenyl-Absorption) is integrated and evaluated by using an internally established calibration curve. The arithmetic mean of two measurements is given as result.

Calibration: Various polypropylene-compounds consisting of PP and a styrene-containing elastomer (of known styrene-content) are prepared and measured according to the method described above.

Preparation of the Test Samples a) Preparation of a Soluble Mg Complex

A magnesium complex solution is prepared by adding, with stirring, 78.0 kg of a 20% solution in toluene of BOMAG ($Mg(Bu)_{1.5}(Oct)_{0.5}$) to 27.0 kg of 2-ethylhexanol in a 150 l steel reactor. During the addition the reactor content is maintained below 40° C. After 30 minutes of stirring, at which time the reaction is completed, 7.8 kg of 1,2 phtaloyl dichloride are added. After addition, stirring of the reaction mixture is continued for 60 minutes. After cooling to room temperature a clear yellowish solution is obtained.

b) Catalyst Synthesis 24.0 kg of titanium tretachloride are placed in a 90 l steel reactor. 21.0 kg of the Mg-complex are then added to the stirred reaction mixture over a period of 2 hours. During the addition of the Mg complex the reactor content is kept below 35° C.

4.5 kg n-heptane and 1.05 l Viscoplex 1-254 of RohMax Additives GmbH (a polyalkyl methacrylate with a viscosity at 100° C. of 90 mm$^2$/s and a density at 15° C. of 0.90 g/ml) are then added to the reaction mixture at room temperature and stirring is maintained at that temperature for further 60 minutes.

The temperature of the reaction mixture is then raised to 90° C. over a period of 60 minutes and held at that level for 40 minutes with stirring. After settling and syphoning the solids undergo washing with a mixture of 0.244 l of a 30% solution in toluene of diethyl aluminium chloride and 50 kg toluene for 110 minutes at 90° C., 50 kg n-heptane for 50 minutes at 50° C., and 50 kg n-heptane for 50 minutes at 25° C. The synthesis is carried out under inert conditions using about one bar over pressure.

Finally, 4.0 kg white oil (Primol 352; viscosity at 100° C. of 8.5 mm$^2$/s; density at 15° C. of 0.87 g/ml) is added to the reactor. The obtained oil slurry is stirred for further 5 minutes at room temperature before the product is transferred to a storage container.

From the oil slurry a solids content of 22.2 wt.-% is analysed. The solid catalyst contains 0.23 wt.-% aluminium, 15.4 wt.-% magnesium, 4.5 wt.-% titanium and 24.5 wt.-% DOP. The heterophasic propylene copolymer (A) is produced in a plant having a prepolymerisation reactor, a loop reactor and two fluid-bed gas phase reactors connected in series. The catalyst as described above, triethylaluminium (TEA) as the cocatalyst and dicyclopentyl dimethoxy silane (Donor D) as an external donor are used.

After a first pre-polymerisation step the modified catalyst is fed to the slurry reactor, where the polymerisation of the polypropylene homopolymer of the matrix phase is initiated. The slurry phase loop reactor is then followed by a first gas phase reactor in series, in which the copolymer part of the matrix phase is made. The polymerisation temperature in the slurry phase loop reactor is 75.0° C., in the first gas phase reactor 80.0° C. After transfer to a second gas phase reactor, the dispersed elastomeric rubber phase is produced by copolymerisation of propylene with ethylene monomer. The operating temperature in the second gas phase reactor is 70° C.

The split between loop/1$^{st}$ GPR/2$^{nd}$ GPR is 47%/42%/11%.

The heterophasic propylene copolymer (A) contains a unimodal rubber.

c) Reaction conditions
Prepolymerisation:

| T [° C.] | 30 |
|---|---|
| TEA/Donor [mol/mol] | 8 |
| TEA/Ti [mol/mol] | 60 |
| TEA/C$_3$ [g/kg] | 0.18 |

Loop Reactor:

| T [° C.] | 75 |
|---|---|
| Pressure [barg] | 55 |
| Density [kg/m$^3$] | 515 |
| H$_2$/C$_3$ [mol/kmol] | 1.2 |
| XCS [wt %] | 2.1 |

1$^{st}$ Gas Phase Reactor:

| T [° C.] | 85 |
|---|---|
| Pressure [barg] | 22 |
| H$_2$/C$_3$ [mol/kmol] | 12 |
| C$_2$/C$_3$ [mol/kmol] | 23 |
| XCS (loop + 1$^{st}$ GPR) [wt %] | 7.0 |
| IV (loop + 1$^{st}$ GPR) [dl/g] | 2.9 |
| C2 (loop + 1$^{st}$ GPR) [wt %] | 2.0 |
| MFR (2,16/230) (loop + 1$^{st}$ GPR) [g/10 min] | 2.2 |

2$^{nd}$ Gas Phase Reactor:

| T [° C.] | 75 |
|---|---|
| Pressure [barg] | 22 |
| H$_2$/C$_3$ [mol/kmol] | 450 |
| C$_2$/C$_3$ [mol/kmol] | 250 |
| XCS (total) [wt %] | 13.3 |
| IV (XCS - total) [dl/g] | 1.7 |
| C2 (total) [wt %] | 4.3 |
| MFR (2,16/230) (total) [g/10 min] | 2.3 |

The mixing of the heterophasic polypropylene copolymer (A) and the styrenic based elastomer (B) is done in a ZSK-57 twin-screw extruder in the molten state. From each of the polymer compositions according to E1-E5 and CE1-CE3, two cast films of 100 μm thickness were prepared on a film extruder (PM 30 Extruder) with a melt temperature of 240-280° C., a melt pressure of 40-80 bar, an extruder screw rotational speed of 50 rpm and a chill roll temperature of 15° C., which were joined by welding as described above under the headline "Seam strength measurements". Subsequently, seam toughness, seam strength, and seam work consumption at break were measured before and after sterilisation. With the films as obtained in this paragraph also the Dynatest measurements are conducted. The results are provided below.

TABLE 1

Properties of the styrene-ethylene/butylene-styrene (SEBS) block copolymer and the hydrogenated styrene-vinyl isoprene (SIS) block rubber

| type | | SEBS-1 Kraton MD 6945 | SIS-1 Hybrar 7311 |
|---|---|---|---|
| styrene | [wt.-%] | 13 | 12 |
| MFR$_2$ (230° C.) | [g/10 min] | 3.5 | 5.7 |
| density | [g/cm$^3$] | 0.890 | 0.890 |

Kraton MD is supplied by Kraton Polymers LLC
Hybrar 7311 is supplied by Kuraray Co, LTD

TABLE 2

Properties of the heterophasic propylene copolymer (HECO)

| Type | | Matrix (1. fr) PP-homo | Matrix (2. fr) PP-copo | Matrix (total) PP-copo | XCS (total) | Total PP HECO |
|---|---|---|---|---|---|---|
| propylene | [wt.-%] | 100 | 95.6 | 98 | 64 | 95.7 |
| ethylene | [wt.-%] | 0 | 4.4 | 2 | 36 | 4.3 |
| XCS | [wt.-%] | 2.1 | — | 7.0 | — | 13.3 |
| IV | [dl/g] | — | — | 2.9* | 1.73** | — |
| MFR$_2$ (230° C.) | [g/10 min] | 2.0 | — | 2.2 | — | 2.3 |
| Tm | [° C.] | — | — | — | — | 164 | fr: fraction
PP-homo: propylene homopolymer
PP-copo: random propylene ethylene copolymer
HECO: heterophasic propylene copolymer
XCS (total): xylene cold soluble fraction of HECO
*intrinsic viscosity of the xylene cold insoluble fraction
**intrinsic viscosity of the xylene cold soluble fraction

TABLE 3

Properties of the examples

| | | CE 1 | CE 2 | CE 3 | E 1 | E 2 | E 4 | E 5 |
|---|---|---|---|---|---|---|---|---|
| HECO | [wt.-%] | 100 | 85 | 85 | 70 | 55 | 75 | 60 |
| SEBS-1 | [wt.-%] | — | 15 | — | 30 | 45 | — | — |
| SIS-1 | [wt.-%] | — | — | 15 | — | — | 25 | 40 |
| haze | [%] | 13.2 | 8.9 | 10.1 | 6.0 | 3.3 | 7.6 | 5.2 |
| haze sterilised | [%] | 16.2 | 13.2 | 15.1 | 10.1 | 6.1 | 13.3 | 14.5 |
| seam elongation at break | [%] | 380 | 423 | 477 | 434 | 505 | 505 | 580 |
| seam elongation at break sterilised | [%] | 68 | 42 | 95 | 156 | 284 | 163 | 227 |
| film toughness | [J/mm] | 24.9 | 32.9 | 35.4 | 31.8 | 35.5 | 35.7 | 35.1 |
| Tm | [° C.] | 163.8 | 164.4 | | 163.3 | 162.3 | | |
| Δ Hm | [J/g] | 109.1 | 75.0 | | 63.8 | 51.9 | | |

We claim:
1. Polymer composition comprising
  (a) a heterophasic propylene copolymer (A) comprising
    (a-1) a polypropylene matrix (A-1) and
    (a-2) an elastomeric propylene copolymer (A-2) comprising at least one comonomer selected from the group consisting of ethylene and C$_4$ to C$_{20}$ α-olefin, and
  (b) styrenic based elastomer(s) (B),
    wherein
    (i) the styrene content in each styrenic based elastomer (B) is equal or below 15 wt.-%, and
    (ii) the total amount of the styrenic based elastomer(s) (B) based on the total amount of polymers present in the polymer composition is of 16.0 to 46.0 wt.-%,
wherein the polypropylene matrix (A-1) contains a copolymer and wherein the polypropylene matrix is at least bimodal in the comonomer content.

2. Polymer composition according to claim 1, wherein the styrenic based elastomer(s) (B) is(are) (a) styrene-ethylene/butylene-styrene (SEBS) block copolymer(s) (B-1) and/or (a) hydrogenated styrene isoprene block rubber(s) (B-2).

3. Polymer composition according to claim 1, wherein the polymer composition comprises as styrenic based elastomer(s) (B) only (a) styrene-ethylene/butylene-styrene (SEBS) block copolymer(s) (B-1) and/or (a) hydrogenated styrene isoprene (SIS) block rubber(s) (B-2).

4. Polymer composition according to claim 1, wherein the ratio of the melt flow MFR$_2$ (230° C.) of the heterophasic propylene copolymer (A) to the melt flow MFR$_2$ (230° C.) of the styrenic based elastomer (B) (MFR$_2$ (230° C.) (A)/MFR$_2$ (230° C.) (B)) is ≤1.0.

5. Polymer composition according to claim 1, wherein the heterophasic propylene copolymer (A) has a xylene cold soluble fraction of 8 to 30 wt.-%.

6. Polymer composition according to claim 5, wherein the xylene cold soluble fraction of the heterophasic propylene copolymer (A) has an amount of propylene-derived units of at least 52 wt.-%.

7. Polymer composition according to claim 5, wherein the intrinsic viscosity of the xylene cold soluble fraction of the heterophasic propylene copolymer (A) is equal or below 4.0 dl/g.

8. Polymer composition according to claim 5, wherein a ratio of the intrinsic viscosity of a xylene cold soluble fraction of the heterophasic propylene copolymer (A) to the intrinsic viscosity of a xylene cold insoluble fraction of the heterophasic propylene copolymer (A) (IV of XCS$_{sol}$/IV of XCS$_{insol}$) is ≤1.0.

9. Polymer composition according to claim 1, wherein the polypropylene matrix (A-1) is a propylene copolymer (A-1') comprising at least one comonomer selected from the group consisting of ethylene and C$_4$ to C$_{20}$ α-olefine.

10. Polymer composition according to claim 9, wherein comonomer content in the propylene copolymer (A-1') is not more than 5.0 wt.-%.

11. Polymer composition according to claim 1, wherein the propylene matrix (A-1) comprises
   (i) 40 to 60 wt.-% of a first fraction being a propylene polymer, and
   (ii) 60 to 40 wt.-% of a second fraction being a propylene random copolymer, wherein the comonomer content between the first fraction and the second fraction differ at least of 2.0 wt.-%.

12. Polymer composition according to claim 1, wherein the heterophasic propylene copolymer (A) has a melt flow rate MFR$_2$ (230° C.) of below 4.0 g/10 min.

13. Polymer composition according to claim 1, wherein the styrenic based elastomer (B) has a melt flow rate MFR$_2$ (230° C.) of below 6.0 g/10 min.

14. Polymer composition according to claim 1, wherein the styrenic based elastomer(s) (B) has a density of below 0.900 g/m$^3$.

15. Polymer film, wherein said polymer film comprises the polymer composition according to claim 1.

16. Polymer film according to claim 15, wherein said film being part of a container.

17. Polymer film according to claim 16, wherein the container has been subjected to a sterilisation treatment.

18. A process for the production of a polymer composition according to claim 1, comprising the following steps:
   preparing a polypropylene matrix (A-1) constituting a matrix,
   preparing an elastomeric propylene copolymer (A-2) comprising at least one comonomer selected from the group consisting of ethylene and C$_4$ to C$_{20}$ α-olefin and dispersing the elastomeric copolymer (A-2) in the propylene copolymer matrix (A-1) to obtain a heterophasic propylene copolymer (A), and subsequently
   mixing said heterophasic propylene copolymer (A) with a styrenic based elastomer(s) (B), wherein said styrenic based elastomer(s) (B) is a styrene-ethylene/butylene-styrene (SEBS) block copolymer (B-1) and/or a hydrogenated styrene-vinyl isoprene block rubber (B-2),
   wherein
   the styrene content in each styrenic based elastomer (B) is equal or below 15 wt.-%, and
   the total amount of the styrenic based elastomer(s) (B) based on the total amount of polymers present in the polymer composition is of 16.0 to 46.0 wt-%.

19. The process according to claim 18, wherein the elastomeric copolymer (A-2) is prepared in the presence of the polypropylene matrix (A-1) constituting the matrix and is in situ dispersed in the matrix.

20. The polymer film according to claim 1 used for the preparation of sterilisable or sterilised films and/or containers, wherein producing a product from said polymer film comprises the step of forming a sterilisable or sterilised film and/or container.

21. Polymer film according to claim 15, wherein the film has been subjected to a sterilisation treatment.

* * * * *